United States Patent
Lochmann et al.

(10) Patent No.: US 9,433,060 B2
(45) Date of Patent: Aug. 30, 2016

(54) POWER FACTOR CORRECTION CIRCUIT, OPERATING DEVICE FOR A LIGHT-EMITTING MEANS AND METHOD FOR CONTROLLING A POWER FACTOR CORRECTION CIRCUIT

(71) Applicant: TRIDONIC GMBH & CO KG, Dornbirn (AT)

(72) Inventors: Frank Lochmann, Esseratsweiler (DE); Peter Lampert, Feldkirch (AT); Hans Auer, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/407,019

(22) PCT Filed: Jun. 12, 2013

(86) PCT No.: PCT/AT2013/000100
§ 371 (c)(1),
(2) Date: Dec. 10, 2014

(87) PCT Pub. No.: WO2013/185157
PCT Pub. Date: Dec. 19, 2013

(65) Prior Publication Data
US 2015/0181675 A1    Jun. 25, 2015

(30) Foreign Application Priority Data
Jun. 12, 2012  (DE) .......... 10 2012 011 755

(51) Int. Cl.
| | |
|---|---|
| *H05B 37/02* | (2006.01) |
| *H05B 33/08* | (2006.01) |
| *H05B 41/28* | (2006.01) |
| *H02M 1/42* | (2007.01) |

(52) U.S. Cl.
CPC ............. *H05B 37/02* (2013.01); *H02M 1/42* (2013.01); *H02M 1/4225* (2013.01); *H05B 33/0815* (2013.01); *H05B 41/28* (2013.01); *Y02B 20/346* (2013.01); *Y02B 70/126* (2013.01)

(58) Field of Classification Search
CPC ........ H05B 37/00; H05B 37/02; H05B 33/00; H05B 33/08; H05B 33/0839; H05B 33/0842; H02M 1/42
USPC ................ 323/222, 220; 315/307, 247, 224
See application file for complete search history.

(56) References Cited

U.S. PATENT DOCUMENTS

2004/0036450 A1 * 2/2004 Aiello et al. .......... 323/222
2005/0088109 A1   4/2005 Storm
(Continued)

FOREIGN PATENT DOCUMENTS

| EP | 1363385 A1 | 11/2003 |
|---|---|---|
| EP | 1526622 A2 | 4/2005 |

*Primary Examiner* — Douglas W Owens
*Assistant Examiner* — Jonathan Cooper
(74) *Attorney, Agent, or Firm* — Volpe and Koenig, P.C.

(57) ABSTRACT

A power factor correction circuit (11) comprises an input for receiving an input voltage ($U_{IN}$), an inductance (21) coupled to the input, a switching means (24) that is coupled to the inductance (21) and that is controllable in order to either charge or discharge the inductance (21), and a control device (14). The control device (14) is set up in order to produce a control signal (Ctrl) for controlling the switching means (24) on the basis of a parameter value. The control device (14) is set up in order to ascertain the parameter value on the basis of an arithmetic sign of a time derivation for the input voltage ($U_{IN}$).

13 Claims, 6 Drawing Sheets

(56) References Cited

U.S. PATENT DOCUMENTS

| | | |
|---|---|---|
| 2007/0036212 A1 | 2/2007 | Leung |
| 2010/0026208 A1* | 2/2010 | Shteynberg et al. ......... 315/297 |
| 2010/0033215 A1 | 2/2010 | Fogg |
| 2010/0127671 A1 | 5/2010 | Lindstroem |
| 2010/0308740 A1 | 12/2010 | Busse et al. |
| 2011/0101879 A1* | 5/2011 | McNay ......................... 315/247 |

* cited by examiner

POWER FACTOR CORRECTION CIRCUIT, OPERATING DEVICE FOR A LIGHT-EMITTING MEANS AND METHOD FOR CONTROLLING A POWER FACTOR CORRECTION CIRCUIT

FIELD OF THE INVENTION

The invention relates to a circuit for power factor correction and to a method for controlling such a circuit. In particular, the invention relates to the technical field of power factor correction for use in operating devices for light-emitting means.

BACKGROUND

Power factor correction (PFC) is used to eliminate or at least reduce harmonic currents in an input current. Harmonic currents can occur in particular in the case of nonlinear consumers, such as rectifiers with subsequent smoothing in switched mode power supplies, for example, since, in the case of such consumers, the input current is phase-shifted despite the sinusoidal input voltage and is distorted non-sinusoidally. The higher-frequency harmonics occurring in the process can be counteracted by an active or clocked power factor correction circuit connected upstream of the respective device.

Power factor correction circuits are also used in operating devices for light-emitting means, for example in electronic control gear or LED converters. The use of such circuits in devices for operating light-emitting means is desirable or necessary since standards restrict the permissible feedback of harmonics into the supply grid.

A circuit topology which is based on the topology of a boost converter is often used for power factor correction circuits. In this case, an inductance or coil to which a rectified AC voltage is supplied is charged with energy or discharged by a controllable switch being switched on and off. The discharge current of the inductance flows via a diode to an output capacitance, with the result that a DC voltage which is higher than the input voltage can be tapped off at the output. Likewise, however, other converter types are also conventional in power factor correction circuits, such as, for example, flyback converters or buck converters.

Power factor correction circuits can have a control device which controls the current consumption. For this purpose, for example, the $T_{on}$ time for which the switch is switched in each case into the on state in order to store energy in the coil can be set.

Owing to undesired capacitances in the input region, it may arise that one or more of the harmonic harmonics are not suppressed to the desired extent. This can result in a current peak in the current consumption of the power factor correction circuits when the input voltage rises again.

The invention is based on the object of providing a method and a circuit for power factor correction which enable particularly effective suppression of harmonics. In particular, there is a need for such apparatuses and methods in which an undesired current peak in the case of a renewed rise in the input voltage can be reduced without changes to the capacitance in the input region, for example, being necessary for this purpose.

SUMMARY

The object is achieved by a power factor correction circuit, an operating device and a method having the features specified in the independent claims. The dependent claims define advantageous and preferred embodiments of the invention.

In the case of a power factor correction circuit in accordance with exemplary embodiments, a switching means is switched depending on a mathematical sign of a time derivative of an input voltage of the power factor correction circuit. In particular, a time period for which the switching means is switched to the on state, and which is also referred to as $T_{on}$ time, can be set depending on the mathematical sign of the time derivative of the input voltage. The $T_{on}$ time can be determined by an additional interval by which the $T_{on}$ time is extended with respect to a value determined by a controller being determined depending on the mathematical sign of the time derivative of the input voltage.

In order to implement control of the switching means depending on the mathematical sign of the time derivative of the input voltage, the mathematical sign of the time derivative of the input voltage can be determined computationally. The mathematical sign of the time derivative of the input voltage can be determined computationally depending on an output circuit variable of the power factor correction circuit. A control device for the switching means can have a controller, which determines a value for the $T_{on}$ time, which is then also extended by the additional interval, depending on the output circuit variable. On the basis of whether a quotient of the value determined by the controller for the $T_{on}$ time and the $T_{off}$ time increases or decreases as a function of time, the mathematical sign of the time derivative of the input voltage can also be determined computationally.

In further configurations, a control device can detect the input voltage and/or a signal can be supplied to the control device, from which signal the mathematical sign of the time derivative of the input voltage can be determined.

In order to reduce the amplitude of a current peak in the input current drawn by the power factor correction circuit, which can be brought about by a harmonic, for example, the $T_{on}$ time can be extended by a first additional interval in comparison with a value determined by a controller when the mathematical sign of the time derivative of the input voltage is positive and can be extended by a second additional interval when the mathematical sign of the time derivative of the input voltage is negative. The first additional interval and the second additional interval can each be dependent on the value of the input voltage. Given the same value of the input voltage, the first additional interval can be greater than the second additional interval. That is to say that, for the same value of the input voltage, the $T_{on}$ time in the case of an increasing input voltage can be extended by an additional interval, which is greater than the corresponding additional interval in the case of a decreasing input voltage, for the same value of the input voltage.

While correction of the $T_{on}$ time which is dependent on the mathematical sign of the time derivative of the input voltage can be used in order to influence the current consumption of the power factor correction circuit in such a way that the amplitude of undesired current peaks in the case of a renewed rise in the input voltage is reduced, other parameters can also be influenced in order to correspondingly match the current consumption.

Correspondingly, a power factor correction circuit in accordance with an exemplary embodiment has an input for receiving an input voltage, an inductance which is coupled to the input, and a switching means which is coupled to the inductance. The switching means is controllable in order to optionally charge and discharge the inductance, i.e. in order to store energy in the inductance and in order to transmit energy to an output capacitor, for example. The power factor correction circuit has a control device which is configured to generate control signals for controlling the switching means depending on a parameter value. The control device is configured to determine the parameter value depending on a mathematical sign of a time derivative of the input voltage.

The parameter value can be, for example, the duration of an additional interval by which the $T_{on}$ time of the switching means is extended.

The control device can be configured to determine the parameter value depending on a present value of the input voltage and depending on the mathematical sign of the time derivative. As a result, amplitudes of current peaks in the case of a renewed rise in the input voltage can be reduced particularly effectively.

The control device can be configured to determine, given the same present value of the input voltage, a first parameter value if the time derivative has a positive mathematical sign, and a second parameter value, which is different therefrom, when the time derivative has a negative mathematical sign. The control device can be configured in such a way that the first parameter value is less than the second parameter value.

The control device can be configured to determine the parameter value on the basis of a first table when the time derivative has a first mathematical sign and to determine the parameter value on the basis of a second table, which is different therefrom, when the time derivative has a second mathematical sign which is opposite the first mathematical sign.

The control device can be configured to switch the switching means into an on state for a $T_{on}$ time. The $T_{on}$ time can be determined depending on the parameter value.

The control device is configured to extend the $T_{on}$ time by an additional interval which is dependent on the input voltage, wherein the parameter value defines a duration of the additional interval.

The control device can be configured to determine computationally the mathematical sign of the time derivative. The control device can be configured to determine computationally the mathematical sign of the time derivative on the basis of a quotient of the $T_{on}$ time and a $T_{off}$ time, for which the switching means is switched in each case to an off state. The control device can be configured to determine the mathematical sign of the time derivative on the basis of whether the quotient of the $T_{off}$ time and the $T_{on}$ time increases or decreases as a function of time.

The control device can be configured to furthermore determine computationally the parameter value depending on an output voltage of the power factor correction circuit.

The control device can be configured as an integrated semiconductor circuit. The control device can in particular be configured as an application-specific integrated circuit (ASIC).

In accordance with a further exemplary embodiment, a control device for controlling a power factor correction circuit is specified. The control device is configured to generate control signals for controlling a switching means of the power factor correction circuit depending on a parameter value. The control device is configured to determine the parameter value depending on a mathematical sign of a time derivative of an input voltage of the power factor correction circuit.

The control device can be configured to select one of a plurality of tables depending on the mathematical sign of the time derivative of the input voltage and to determine the parameter value by a table scan of the selected table.

The control device can be configured for use in a power factor correction circuit in accordance with one exemplary embodiment.

In accordance with a further exemplary embodiment, an operating device for a light-emitting means which comprises a power factor correction circuit in accordance with an exemplary embodiment is specified. The operating device can be configured as an LED converter or as electronic control gear. The operating device can comprise a resonant converter, to which energy is supplied by the power factor correction circuit.

In accordance with a further exemplary embodiment, a lighting system which comprises the operating device and light-emitting means coupled thereto is specified. The light-emitting means can comprise one or more gas discharge lamps, florescent lamps or another fluorescent light-emitting means. The light-emitting means can comprise one or more light-emitting diodes (LEDs). The light-emitting means can be embodied separately from the operating device. The lighting system can furthermore comprise a central control system, which is configured to communicate dimming commands to the operating device or to evaluate signals transmitted by the operating device.

In accordance with a further exemplary embodiment, a method for controlling a power factor correction circuit is specified, wherein the power factor correction circuit comprises an input for receiving an input voltage, an inductance, which is coupled to the input, and a switching means, which is coupled to the inductance and which is controllable in order to optionally charge and discharge the inductance. In the method, control signals for switching the switching means depending on a parameter value are generated. The parameter value is determined depending on a mathematical sign of a time derivative of the input voltage.

Developments of the method and the effects achieved in each case thereby correspond to the developments of the power factor correction circuit in accordance with the exemplary embodiments.

The parameter value can be determined depending on both the mathematical sign of the time derivative and a present value of the input voltage.

The parameter value can be determined by scanning a first table when the time derivative has a first mathematical sign and can be determined by scanning a second table, which is different therefrom, when the time derivative has a second mathematical sign which is opposite the first mathematical sign.

A $T_{on}$ time for which the switching means is switched into an on state in each case can be dependent on the parameter value. The parameter value can specify the duration of an additional interval by which the $T_{on}$ time is extended in comparison with a value determined by a controller.

The method can be implemented using a power factor correction circuit in accordance with an exemplary embodiment, wherein the control device performs the determination of the parameter value and the generation of the control signal for actuating the switching means.

In the case of apparatuses and methods in accordance with exemplary embodiments, a current peak can be reduced effectively, for example, in the case of a renewed rise in the input voltage by taking into consideration the mathematical sign of the time derivative of the input voltage in the control of the switching means. Specific matching of other components of the power factor correction circuit, for example a radiofrequency magnetic return path capacitor, is not required for this purpose.

BRIEF DESCRIPTION OF THE DRAWINGS

The invention will be explained below with reference to the drawings on the basis of preferred embodiments.

DETAILED DESCRIPTION OF THE PREFERRED EMBODIMENTS

Figure 1:
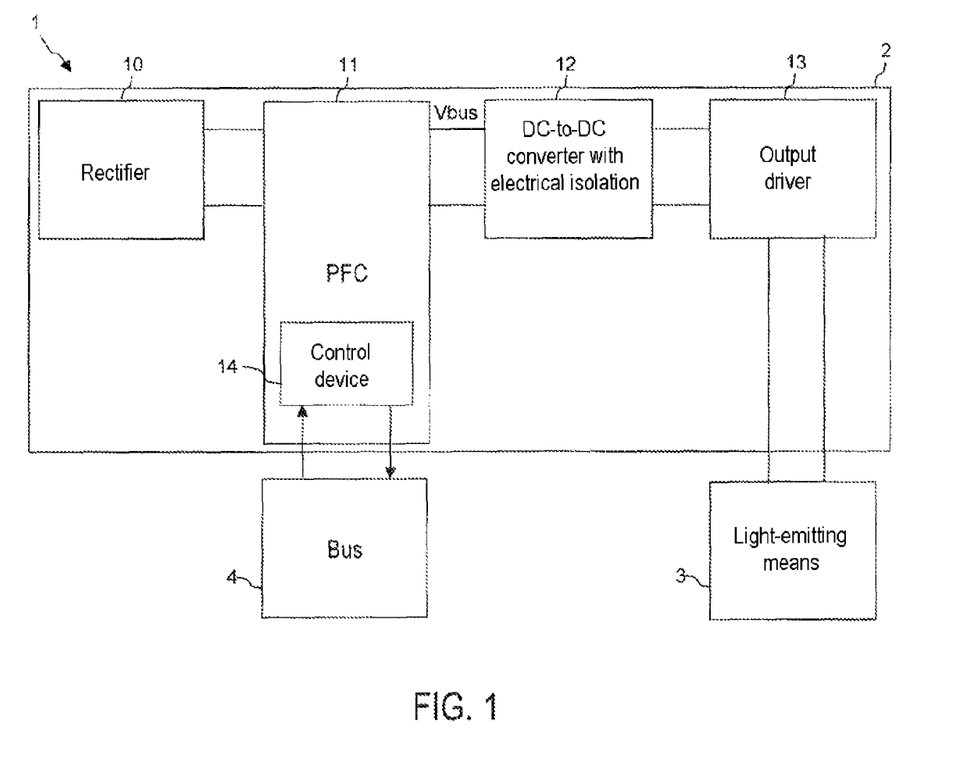
FIG. 1 shows a lighting system comprising a power factor correction circuit in accordance with one exemplary embodiment.

FIG. 1 shows a block diagram illustration of a lighting system 1, which comprises an operating device 2 for a light-emitting means 3. The light-emitting means 3 can comprise, for example, a gas discharge lamp, a fluorescent lamp or another fluorescent light-emitting means or LEDs. The operating device 2 can be connected to a bus 4 or a wireless communication system in order to receive dimming commands and/or output status messages.

The operating device 2 can be configured as electronic control gear (ECG) for a gas discharge lamp, fluorescent lamp or another fluorescent light-emitting means or as an LED converter, for example. The operating device 2 has a rectifier 10 for rectifying a supply voltage, for example the mains voltage. The operating device 2 has a power factor correction circuit 11. The power factor correction circuit 11 provides an output voltage for downstream components of the operating device 2, which output voltage is also referred to as bus voltage Vbus. A further voltage conversion and/or dimming functions can be achieved, for example, via a DC-to-DC converter 12, which can be configured as an LLC resonant converter, and/or an output driver 13. A control device 14 can perform various control or regulation functions.

The mode of operation of the power factor correction circuit 11 in accordance with the exemplary embodiments will be described in more detail with reference to FIGS. 2-7. While FIG. 1 shows schematically an operating device in which the power factor correction circuit 11 provides a bus voltage to other components of the operating device 2, the power factor correction circuit in accordance with exemplary embodiments can also be used as an isolated power factor correction circuit with a downstream driver stage.

Figure 2:
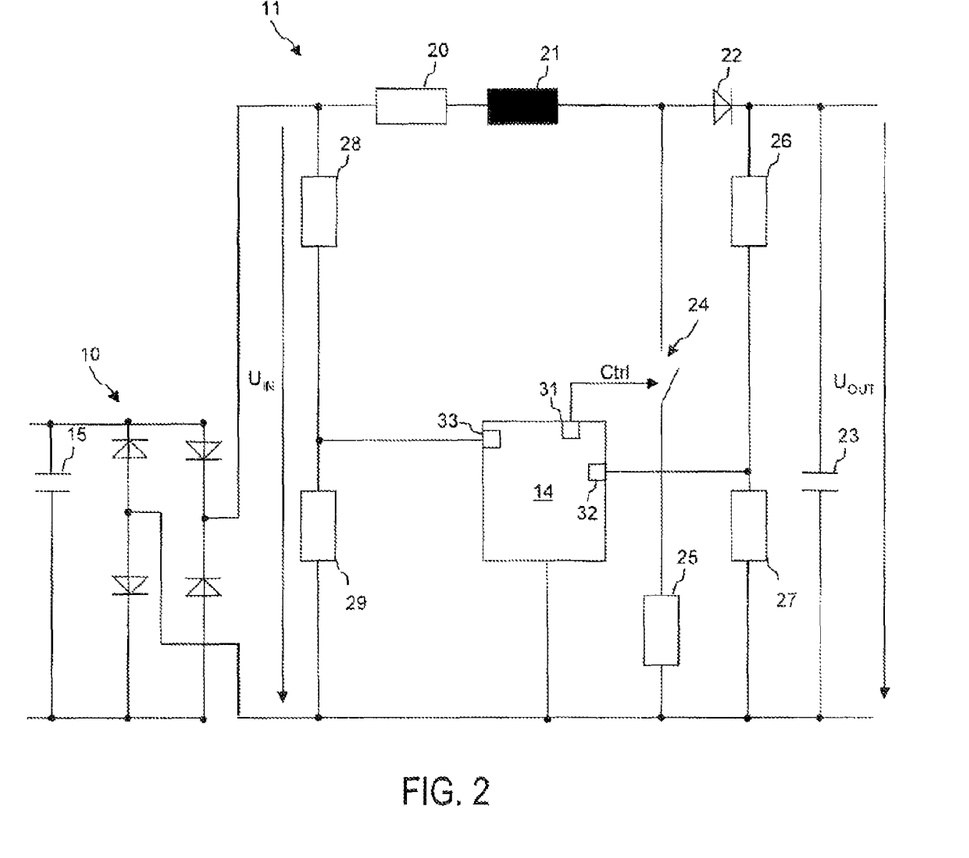
FIG. 2 shows a circuit diagram of a power factor correction circuit in accordance with one exemplary embodiment.

FIG. 2 shows a circuit diagram of the power factor correction circuit 11 in accordance with one exemplary embodiment. An AC supply voltage, for example the mains voltage, is smoothed by a capacitor 15 and converted by the rectifier 10 into a rectified AC voltage, which is present as input voltage $U_{IN}$ at the input of the power factor correction circuit 11.

The input voltage $U_{IN}$ is supplied to an inductance 21 of the power factor correction circuit, which inductance can comprise a coil. A resistor 20 at the input of the power factor correction circuit is likewise illustrated schematically. The inductance 21 is connected in series with a diode 22 between the input connection and an output connection of the power factor correction circuit 11. A DC output voltage $U_{out}$ is provided at the output connection, which is coupled to an output capacitor 23. The DC output voltage $U_{out}$ is used for supplying a load, with the power factor correction circuit 11 being connected upstream of said load. The load may be, for example, a DC-to-DC converter with light-emitting means connected thereto.

A controllable switch 24, which acts as controllable switching means, is connected to the connection between the inductance 21 and the diode 22. The controllable switch 24 can be connected to ground via a shunt resistor 25. The switch 24 is a controllable electronic switch, which may be a circuit breaker and which may be in the form of a field-effect transistor (FET), in particular in the form of a MOSFET, for example. The switch 24 is switched into the on state and the off state by the control device 14 of the power factor correction circuit 11. The control device 14 has a corresponding output 31 for controlling a control signal, with which, for example, the gate voltage of the switch 24 can be controlled.

In the switched-on state of the switch 24, the inductance 21 is connected to ground via the switch 24, wherein the diode 22 is off, with the result that the inductance 21 is charged and energy is stored in the inductance 21. If, on the other hand, the switch 24 is switched off, i.e. open, the diode 22 is on, with the result that the inductance 21 can discharge into the output capacitor 23 via the diode 22 and the energy stored in the inductance 21 is transferred to the output capacitor 23.

The switch 24 is actuated by the control device 14, which may be configured in the form of an integrated circuit, in particular in the form of an application-specific integrated circuit (ASIC). The power factor correction is achieved by repeated switching-on and switching-off of the switch 24, wherein the switching frequency for the switch 24 is much higher than the frequency of the rectified AC input voltage $U_{IN}$. The power factor correction circuit 11 can operate as boost converter. The mode of operation of the control device 14 is described in even more detail with reference to FIGS. 3-7.

The control device 14 is generally configured in such a way that it generates a control signal Ctrl for actuating the switch 24 depending on a parameter value. The control device 14 is configured to determine the parameter value depending on a mathematical sign of a time derivative of the input voltage $U_{IN}$ and then to generate the control signal in accordance with the determined parameter value. The parameter value can be, for example, a time period, referred to as $T_{on}$ time, for which the switch 24 is switched in each case to the on state in order to store energy in the inductance 21 or can influence said time period. For example, as will be described in more detail, a value $T_{on,0}$ determined by a controller for the $T_{on}$ time is extended by an additional interval, whose duration is dependent both on the present value of the input voltage $U_{IN}$ and on the mathematical sign of the time derivative thereof. As a result, an extension of the $T_{on}$ time which defines a correction term for the $T_{on}$ time and is used for further reducing harmonics can take place differently for the same input voltage $U_{IN}$ depending on whether the input voltage $U_{IN}$ increases or decreases.

Various configurations are possible with which the control device 14 can determine the mathematical sign of the time derivative of the input voltage $U_{IN}$. The control device 14 can have an input 32, at which the output voltage is detected via a voltage divider comprising resistors 26, 27. The control device 14 can comprise a controller, which determines values for the $T_{on}$ time depending on the output voltage or another output circuit variable. Optionally, the controller can also determine the time period, referred to as $T_{off}$ time, for which the switch 24 is switched into the off state. The control device 14 can comprise logic for determining, depending on a quotient of the $T_{on}$ time and $T_{off}$ time, whether the input voltage is increasing or decreasing at that time. The $T_{on}$ time determined by the controller can then also be extended by an additional interval, whose duration is dependent on the mathematical sign of the time derivative of the input voltage $U_{IN}$.

As an alternative or in addition, the control device 14 can have a further input 33, at which the input voltage $U_{IN}$ is detected via a voltage divider comprising resistors 28, 29. The control device 14 can determine, from the signal received at the further input 33, whether the input voltage $U_{IN}$ is increasing or decreasing at that time.

In yet a further configuration, a circuit which is separate from the control device 14 can be used, whose output signal is dependent on the mathematical sign of the time derivative of the input voltage $U_{IN}$. This signal indicating the mathematical sign of the time derivative of the input voltage $U_{IN}$ can be supplied to the control device 14.

The control device 14 can detect the input voltage $U_{IN}$ or else the time derivative thereof also with the aid of a secondary winding on the inductance 21, for example.

Figure 3:
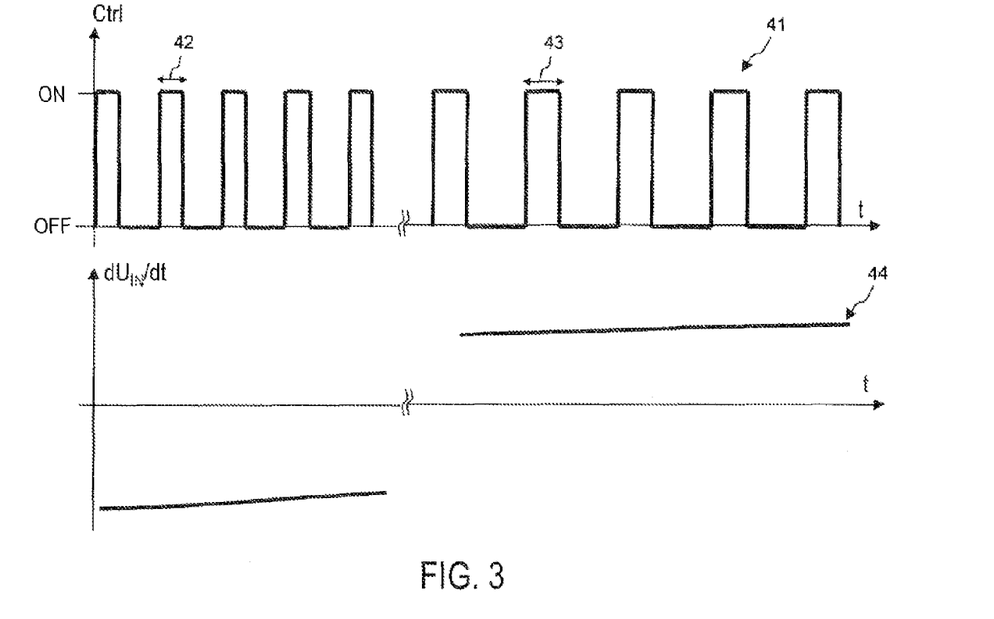
FIG. 3 shows a schematic illustration of a control signal output by a control device of the power factor correction circuit in accordance with one exemplary embodiment for explaining the way in which the power factor correction circuit operates.

FIG. 3 illustrates the mode of operation of the control device 14. FIG. 3 shows a control signal 41 actuated by the control device 14 and the time derivative 44 of the input voltage. The control device 14 causes the switch 14 to be switched in each case to the on state for a $T_{on}$ time determined by the control device 14. The corresponding control signal 41 for clocked switching of the switch 14 is generated by the control device 14 depending on a parameter value. The parameter value can be, for example, the time period of an additional interval by which the $T_{on}$ time is extended in each case. This time period of the additional interval can be determined by the control device 14 depending on both the present value of the input voltage $U_{IN}$ and the mathematical sign of the time derivative $dU_{IN}/dt$. Correspondingly, different $T_{on}$ times 42 and 43 result even for the same present value of the input voltage $U_{IN}$ when the mathematical sign of the time derivative $dU_{IN}/dt$ is different.

The control device 14 therefore performs actuation of the switch 24 depending on the mathematical sign of the time derivative of the input voltage, $dU_{IN}/dt$. In particular, the duration of the $T_{on}$ time can be dependent both on the present value of the input voltage and on whether the input voltage is increasing or decreasing at that time.

The control device 14 can be configured in such a way that it performs the actuation of the switch 24 differently depending on whether the mathematical sign of the time derivative of the input voltage, $dU_{IN}/dt$, is positive or negative. For example, the determination of the $T_{on}$ time for which the switch 24 is intended to be switched to the on state can comprise table scanning. Depending on the mathematical sign of the time derivative of the input voltage, $dU_{IN}/dt$, different tables can be used for the table scanning.

Figure 4:
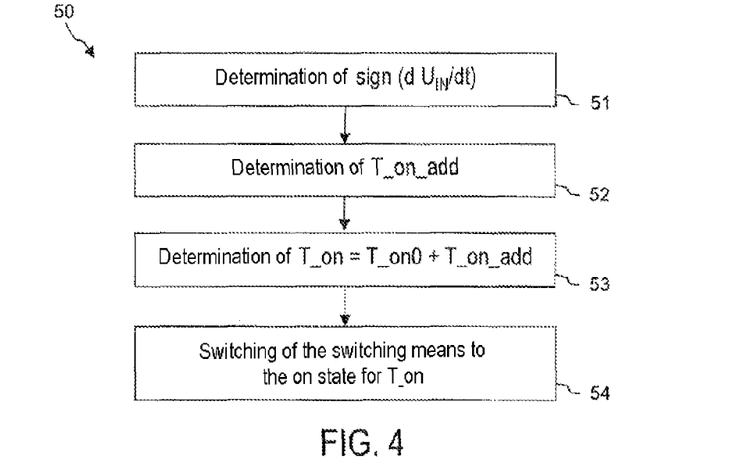
FIG. 4 shows a flowchart of a method in accordance with one exemplary embodiment.

FIG. 4 shows a flowchart of a method 50 in accordance with one exemplary embodiment. The method 50 can be performed by the control device 14.

In step 51, a mathematical sign of the time derivative of the input voltage of the power factor correction circuit is determined. The mathematical sign of the time derivative of the input voltage can be determined computationally. The mathematical sign of the time derivative of the input voltage can be determined depending on whether the quotient of $T_{on}$ time and $T_{off}$ time increases or decreases.

In step 52, a time period $T_{on,add}$ of an additional interval by which the $T_{on}$ time is intended to be extended is determined. This time period can be determined by a table scan. Depending on whether the mathematical sign of the time derivative of the input voltage is positive or negative, different tables can be scanned. For example, the time period of the additional interval can be determined on the basis of a first table when the mathematical sign of the time derivative is positive and on the basis of a second table when the mathematical sign of the time derivative is negative. Both the first table and the second table can each specify the time period of the additional interval by which the $T_{on}$ time is intended to be extended depending on the value of the input voltage. The first and second tables can in this case be configured in such a way that the time period $T_{on,add}$ of the additional interval by which the $T_{on}$ time is extended is greater when the input voltage increases than when the input voltage decreases, for a given value of the input voltage $U_{IN}$.

In step 53, the $T_{on}$ time can be determined depending on the time period $T_{on,add}$ determined in step 52 of the additional interval by which the $T_{on}$ time is extended. For this purpose, this time period can be added to a value $T_{on,0}$, which is determined by a controller in the control device 14 depending on the output circuit variable. The $T_{on}$ time can be determined as $$T_{on} = T_{on,0} + T_{on,add}. \quad (1)$$

In the $T_{on}$ time thus determined, the term $T_{on,add}$ is dependent on the mathematical sign of the time derivative of the input voltage.

In step 54, the switch 24 can be switched to the on state for a time which was determined in step 53 in accordance with equation (1). The control of the switch 24 is dependent on the mathematical sign of the time derivative of the input voltage.

Figure 5:
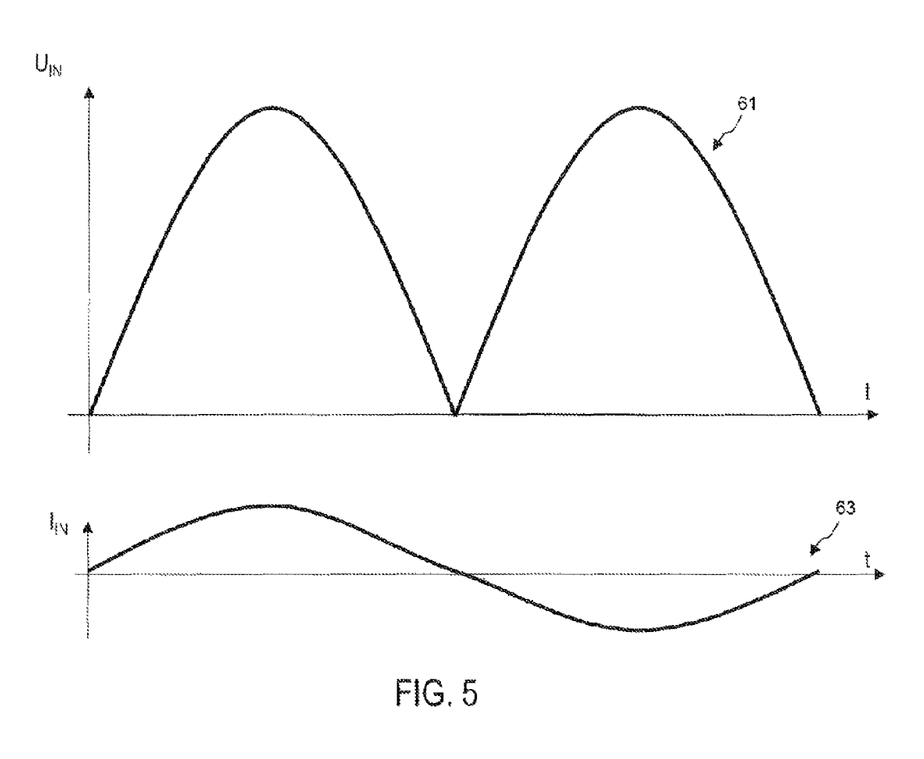
FIG. 5 shows a parameter value for controlling the switching means, which is determined depending on the mathematical sign of a time derivative of an input voltage, and the corresponding input current in the case of a power factor correction circuit in accordance with one exemplary embodiment.

FIG. 5 illustrates schematically the mode of operation of a power factor correction circuit in accordance with one exemplary embodiment. An input voltage 61, which may be a rectified AC voltage, is supplied to the power factor correction circuit.

A parameter value which determines the $T_{on}$ time for which the switch 24 is switched to the on state in order to store energy in the inductance 21 is determined taking into consideration the mathematical sign of the time derivative of the input voltage 61. For example, the time period $T_{on,add}$ of an additional interval by which the $T_{on}$ time is intended to be extended can be determined depending on the value of the input voltage and on the mathematical sign of the time derivative of the input voltage. By taking into consideration whether the input voltage is increasing or decreasing, different ways for the time period $T_{on,add}$ of the additional interval by which the $T_{on}$ time is extended can be determined, even when the value of the input voltage is in each case equal.

The input current 63 drawn by the power factor correction circuit can further be smoothed when the time period $T_{on,add}$ of the additional interval by which the $T_{on}$ time is extended is determined depending on both the value of the input voltage and the mathematical sign of the time derivative of the input voltage. In particular, an amplitude of a current peak which may occur in the case of a renewed rise in the input voltage can be reduced.

Figure 6:
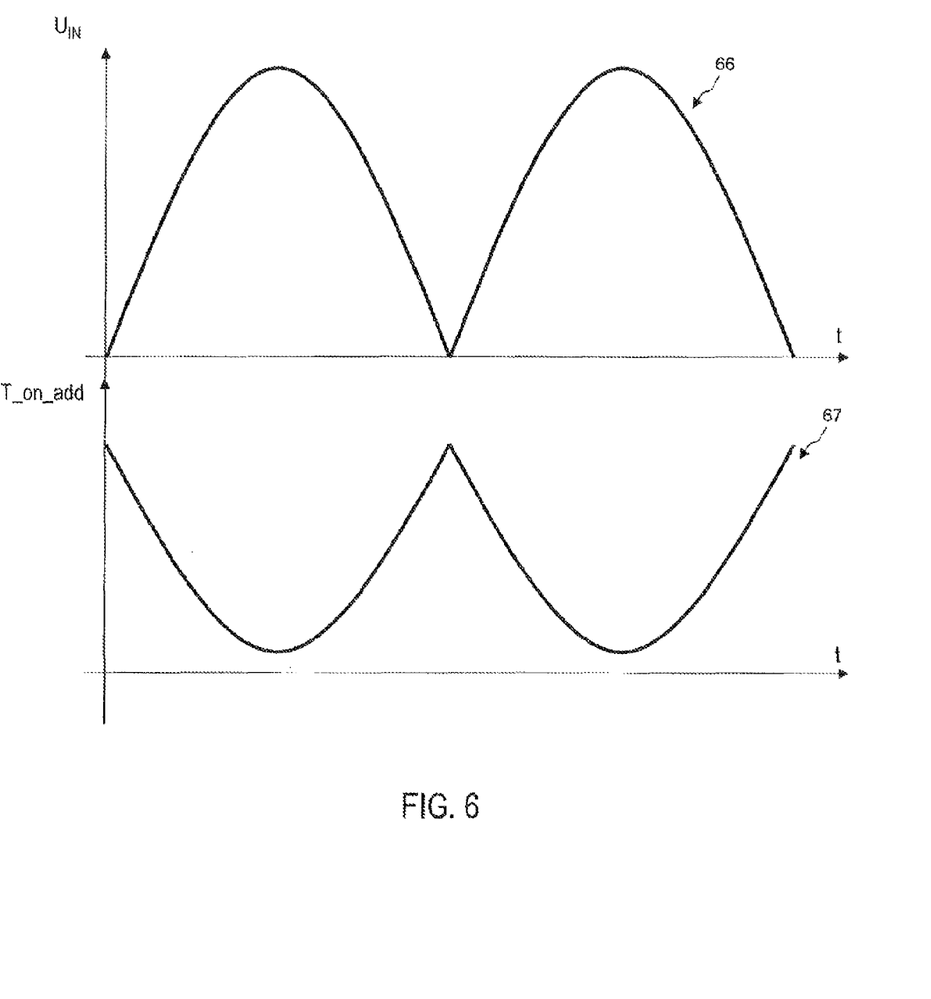
FIG. 6 shows, for comparison purposes, the input current in the case of a power factor correction circuit in which the parameter value is determined independently of the mathematical sign of the time derivative of the input voltage.

FIG. 6 illustrates, in comparison with this, the mode of operation of a power factor correction circuit in which the $T_{on}$ time is not dependent on the mathematical sign of the time derivative of the input voltage. An input voltage 66, which may be a rectified AC voltage, is supplied to the power factor correction circuit. A time period $T_{on,add}$ of an additional interval by which the $T_{on}$ time is extended is determined depending on the value of the input voltage, but independently of the mathematical sign of the time derivative of the input voltage, as illustrated by the curve 67. The input current drawn by the power factor correction circuit can in this case have a current peak, whereby, in comparison with the case illustrated in FIG. 5 in which the time period $T_{on,add}$ of the additional interval is also dependent on the mathematical sign of the time derivative of the input voltage, an input current is drawn which no longer continuously follows the sinusoidal profile, but may have peaks or constant segments.

By matching the control of the switch, for example by changing the time period $T_{on,add}$ of the additional interval by which the $T_{on}$ time is extended in accordance with equation (1) depending on the mathematical sign of the time derivative of the input voltage, the amplitude of a current peak which may occur in the input current drawn by the power factor correction circuit in the case of a renewed rise in the input voltage can be reduced. However, the current peak does not necessarily need to be eliminated completely.

By matching the actuation of the switch 24 depending on the mathematical sign of the time derivative of the input voltage, an amplitude of the current peak in the input current which is lower than the amplitude of the current peak in the case of actuation of the switch 24 without taking into consideration the mathematical sign of the time derivative of the input voltage can be achieved. The current peak in the current drawn by the power factor correction circuit can thus be reduced. Correspondingly, individual or a plurality of harmonics can be reduced in comparison with total harmonic distortion.

Matching of the actuation of the switch 24 depending on the mathematical sign of the time derivative of the input voltage can take place in a variety of ways. For example, parameter values which influence the actuation of the switch 24 can be selected from one of a plurality of tables depending on whether the input voltage is increasing or decreasing at that time.

The mathematical sign of the time derivative of the input voltage can be determined by a corresponding circuit and provided to the control device 14. As an alternative or in addition, the control device 14 can also be configured such that it determines computationally the mathematical sign of the time derivative of the input voltage. For this purpose, it is possible to determine, for example, whether a quotient of $T_{on}$ time and $T_{off}$ time increases or decreases. For example, it is possible to determine whether the input voltage is increasing or decreasing at that time depending on the mathematical sign $$V_z = \text{sign}\left(\frac{d}{dt}\left(\frac{T_{off}(t)}{T_{on}(t)}\right)\right), \quad (2)$$

which indicates whether the quotient of $T_{off}$ time and $T_{on}$ time is increasing or decreasing. An evaluation of equation (2) can be performed, for example, on the basis of the value of $T_{on,0}$ determined by a controller of the control device depending on the output voltage $U_{out}$. The time derivative in equation (2) does not also need to be explicitly calculated. Information on whether the input voltage is increasing or decreasing can be obtained from whether the quotient $T_{off(t)}/T_{on(t)}$ is increasing or decreasing. For this purpose, the quotient can be evaluated at different, discrete times by the control device 14 in order to determine whether the quotient $T_{off(t)}/T_{on,0(t)}$ is increasing or decreasing.

Information on the mathematical sign of the time derivative of the input voltage can be used to select one of a plurality of tables which is used for the determination of the $T_{on}$ time. For example, a value for the time period $T_{on,add}$ of the additional interval by which the $T_{on}$ time is extended in accordance with equation (1) can be determined on the basis of a first table or a second table depending on whether the mathematical sign determined in accordance with equation (2) is positive or negative. As an alternative or in addition, it is possible to perform a selection from among different formulae which are used for the computational determination of a parameter value, for example the time period $T_{on,add}$, depending on whether the mathematical sign determined in accordance with equation (2) is positive or negative. It is possible to monitor whether the variable determined in accordance with equation (2) has a change from +1 to −1, or vice versa. In the case of a change of mathematical sign, it is possible for there to be a change between different tables which are used by the control device 14 for controlling the switch 24.

The control device 14 can be configured as an integrated semiconductor circuit, for example. The control device 14 can be configured as an ASIC.

The control device 14 can comprise a controller, which calculates the value $T_{on,0}$ for the $T_{on}$ time depending on an output circuit variable, for example depending on the output voltage $U_{out}$ of the power factor correction circuit. The controller can also determine the $T_{off}$ time. The $T_{off}$ time can also be determined in another way, for example by monitoring a zero crossing of the current through the inductance 21.

The control device 14 can furthermore comprise a memory. A plurality of tables can be stored in the memory. Each of the tables can contain values for the time period $T_{on,add}$ of an additional interval by which the $T_{on}$ time is extended, as a function of the value of the input voltage. A first table is assigned to a first mathematical sign of the time derivative of the input voltage. A second table is assigned to a second mathematical sign of the time derivative of the input voltage.

The control device 14 can also comprise logic. The logic can select either the first table or the second table depending on the mathematical sign of the time derivative of the input voltage. On the basis of the table selected, a parameter value can be read by a table scan using the present value of the input voltage of the power factor correction circuit. The control of the switch 24 can take place depending on the corresponding parameter value. The parameter value can be the time period $T_{on,add}$ of the additional interval by which the $T_{on}$ time is extended. The logic can determine the $T_{on}$ time in accordance with equation (1) depending on the value $T_{on,0}$ determined by the controller for the $T_{on}$ time and the value called up from the selected table for the time period $T_{on,add}$ of the additional interval by which the $T_{on}$ time is extended. A control signal of the control device 14, which control signal switches the switch 24 to the on state for the $T_{on}$ time thus determined, can be controlled via an output of the control device 14.

The logic can determine computationally the mathematical sign of the time derivative of the input voltage of the power factor correction circuit. For example, the logic can determine the mathematical sign of the time derivative depending on the time period $T_{on,0}$ determined by the controller. The logic can determine the mathematical sign of the time derivative of the input voltage in accordance with equation (2), for example, wherein the value $T_{on,0}$ determined by the controller can be used as value in the denominator of the quotient on the right-hand side of equation (2). The logic and/or the controller can also determine computationally the present value of the input voltage, for example from the detected output voltage $U_{out}$. As an alternative or in addition, the control device 14 can have a further input in order to detect the input voltage $U_{IN}$, as illustrated in FIG. 2. In this case, the present value of the input voltage and/or the mathematical sign of its time derivative can be determined depending on the signal received at the further input.

In the case of the power factor correction circuits and methods in accordance with exemplary embodiments, the tables from which a parameter value is read depending on the mathematical sign of the time derivative of the input voltage of the power factor correction circuit can be variable. The tables can be different, for example, depending on the load to which energy is supplied. The control device 14 can be configured in such a way that the tables in the memory are configurable in a simple manner. For example, the control device 14 can be programmable, with the result that different tables can be stored in the memory.

Figure 7:
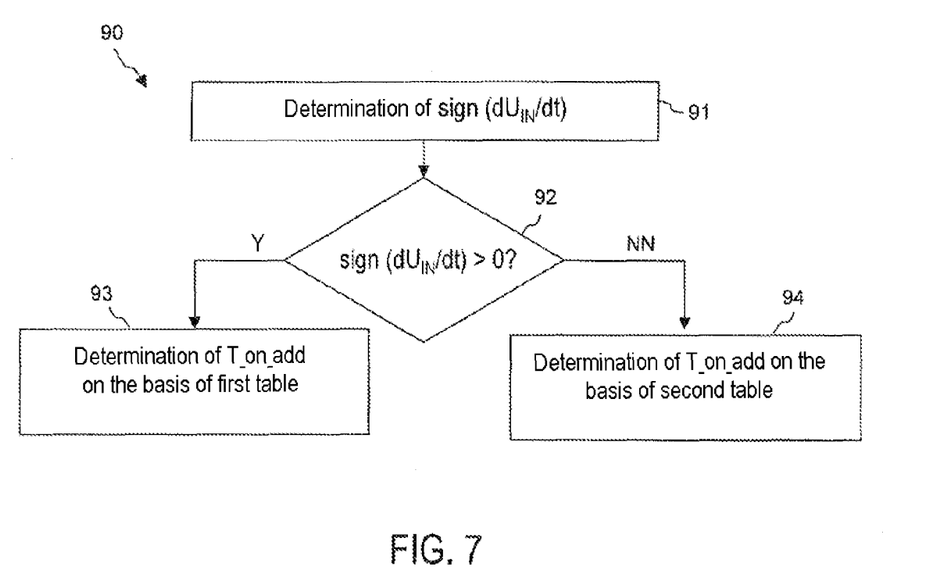
FIG. 7 shows a flowchart of a method which is implemented by the control device of a power factor correction circuit in accordance with one exemplary embodiment.

FIG. 7 is a flowchart of a method 90, which can be implemented by the control device 14. The method can be used to implement different actuation of the switch 24 depending on whether the input voltage is increasing or decreasing at that time.

In step 91, the mathematical sign of the time derivative of the input voltage is determined. The mathematical sign of the time derivative of the input voltage can be determined, for example, by monitoring the input voltage or computationally from output circuit variables.

In step 92, it is determined whether the mathematical sign of the time derivative of the input voltage is positive. If the mathematical sign is positive, in step 93 a parameter value is determined for actuating the switch 24 on the basis of a first table. For example, the time period $T_{on,add}$ of the additional interval by which the $T_{on}$ time is extended can be determined on the basis of the first table. If the mathematical sign is negative, in step 94 the parameter value for actuating the switch 24 is determined on the basis of a second table. For example, the time period $T_{on,add}$ of the additional interval by which the $T_{on}$ time is extended can be determined on the basis of the second table. The parameter value which is determined depending on the mathematical sign of the time derivative of the input voltage can be used for corresponding actuation of the switch 24. In this case, the $T_{on}$ time can be determined in accordance with equation (1).

While exemplary embodiments have been described with reference to the figures, modifications can be realized in further exemplary embodiments. For example, the functions of the control device 14 can also be implemented by a plurality of separate circuits.

While exemplary embodiments have been described in which the time period $T_{on,add}$ of the additional interval by which the $T_{on}$ time is extended is determined depending on the mathematical sign of the time derivative of the input voltage, other variables can also be determined depending on the mathematical sign of the time derivative of the input voltage, which variables influence the current consumption of the power factor correction circuit.

While exemplary embodiments have been described in which one of a plurality of tables from which a parameter value is called up is selected depending on the mathematical sign of the time derivative of the input voltage, actuation dependent on the mathematical sign of the time derivative can also be performed in another way. For example, parameter values do not need to be stored on a family of characteristics basis. It is possible for one of a plurality of formulae which can be used for determining the time period $T_{on,add}$ of the additional interval by which the $T_{on}$ time is extended and/or for determining another parameter value for the actuation of the switch 24 to be selected, for example, depending on the mathematical sign of the time derivative of the input voltage.

In addition or as an alternative, it is also possible to determine the parameter value depending on the steepness of the change in the input voltage $U_{IN}$, i.e. on the rise of the time derivative of the input voltage $U_{IN}$.

Methods and apparatuses in accordance with exemplary embodiments can be used in operating devices for light-emitting means, for example in electronic control gear or in an LED converter.

The invention claimed is:

1. A power factor correction circuit, comprising: an input that receives an input voltage ($U_{IN}$), an inductance (21) coupled to the input, a switching means (24), which is coupled to the inductance (21) and which is controllable in order to charge or discharge the inductance (21), a control device (14) which is configured to generate a control signal (Ctrl) for controlling the switching means (24) depending on a parameter value, wherein the control device (14) is configured to determine the parameter value depending on a mathematical sign of a time derivative of the input voltage ($U_{IN}$), wherein the control device (14) is configured to determine the parameter value depending on a present value of the input voltage (UIN) and the mathematical sign of the time derivative and wherein the control device (14) is configured to determine, given the same present value of the input voltage (UIN), a first parameter value if the time derivative has a positive mathematical sign, and a second parameter value, which is different therefrom, when the time derivative has a negative mathematical sign.

2. The power factor correction circuit as claimed in claim 1, wherein the control device (14) is configured in such a way that the first parameter value is less than the second parameter value.

3. A power factor correction circuit, comprising: an input that receives an input voltage (UIN), an inductance (21) coupled to the input, a switching means (24), which is coupled to the inductance (21) and which is controllable in order to charge or discharge the inductance (21), a control device (14) which is configured to generate a control signal (Ctrl) for controlling the switching means (24) depending on a parameter value, wherein the control device (14) is configured to determine the parameter value depending on a mathematical sign of a time derivative of the input voltage (UIN), wherein the control device (14) is configured to determine the parameter value on the basis of a first table when the time derivative has a first mathematical sign and to determine the parameter value on the basis of a second table, which is different therefrom, when the time derivative has a second mathematical sign which is opposite the first mathematical sign.

4. The power factor correction circuit as claimed in claim 1, wherein the control device (14) is configured to switch the switching means (24) to an on state for a $T_{on}$ time (42, 43), and wherein the $T_{on}$ time (42, 43) is dependent on the parameter value.

5. The power factor correction circuit as claimed in claim 4, wherein the control device (14) is configured to extend the $T_{on}$ time by an additional interval which is dependent on the input voltage ($U_{IN}$), wherein the parameter value defines a duration of the additional interval.

6. The power factor correction circuit as claimed in claim 4, wherein the control device (14) is configured to determine computationally the mathematical sign of the time derivative.

7. The power factor correction circuit as claimed in claim 6, wherein the control device (14) is configured to determine computationally the mathematical sign of the time derivative on the basis of a quotient of a $T_{off}$ time, for which the switching means (24) is switched to an off state in each case, and the $T_{on}$ time.

8. A power factor correction circuit, comprising: an input that receives an input voltage (UIN), an inductance (21) coupled to the input, a switching means (24), which is coupled to the inductance (21) and which is controllable in order to charge or discharge the inductance (21), a control device (14) which is configured to generate a control signal (Ctrl) for controlling the switching means (24) depending on a parameter value, wherein the control device (14) is configured to determine the parameter value depending on a mathematical sign of a time derivative of the input voltage (UIN), wherein the control device (14) is configured to determine computationally the parameter value depending on an output circuit variable of the power factor correction circuit.

9. An operating device for a light-emitting means, comprising a power factor correction circuit (11) as claimed in claim 1.

10. A method for controlling a power factor correction circuit (11), which comprises an input that receives an input voltage ($U_{IN}$), an inductance (21) coupled to the input and a switching means (24), which is coupled to the inductance (21) and is controllable in order to charge or discharge the inductance (21), the method comprising: generating a control signal (Ctrl) for switching the switching means (24) depending on a parameter value, and determining the parameter value depending on a mathematical sign of a time derivative of the input voltage ($U_{IN}$), wherein the parameter value is determined by scanning a first table when the time derivative has a first mathematical sign and by scanning a second table, different therefrom, when the time derivative has a second mathematical sign which is opposite the first mathematical sign.

11. The method as claimed in claim 10, wherein the parameter value is determined depending on both the mathematical sign of the time derivative and a present value of the input voltage ($U_{IN}$).

12. The method as claimed in claim 10, wherein a $T_{on}$ time (42, 43) for which the switching means (24) is switched into an on state is dependent on the parameter value.

13. A method for controlling a power factor correction circuit (11), which comprises an input that receives an input voltage ($U_{IN}$), an inductance (21) coupled to the input and a switching means (24), which is coupled to the inductance (21) and is controllable in order to charge or discharge the inductance (21), the method comprising: generating a control signal (Ctrl) for switching the switching means (24) depending on a parameter value, and determining the parameter value depending on a mathematical sign of a time derivative of the input voltage ($U_{IN}$) wherein the method is implemented using a power factor correction circuit (11) as claimed in claim 1.

* * * * *